United States Patent [19]

Gable et al.

[11] 4,271,507
[45] Jun. 2, 1981

[54] COMMUNICATION BROADCAST CHANNEL INTERFACE

[75] Inventors: Melvin G. Gable, Ypsilanti; Richard H. Sherman, Plymouth; Vadivelu Jeyabalan, Ann Arbor, all of Mich.

[73] Assignee: Ford Motor Company, Dearborn, Mich.

[21] Appl. No.: 46,578

[22] Filed: Jun. 7, 1979

[51] Int. Cl.³ .............................................. H04J 6/00
[52] U.S. Cl. ........................................ 370/94; 370/79
[58] Field of Search ....................... 370/94, 60, 92, 79; 364/200

[56] References Cited

U.S. PATENT DOCUMENTS 4,161,786   7/1979   Hopkins et al. ...................... 370/94

OTHER PUBLICATIONS

"Data Pac: A Public, Shared Data Network for Canada" by Clipsham et al. *Telesis,* vol. 4, No. 5, pp. 130–136, Apr. 1976.

"Experimental Packet–Switched Service . . . " by Neil et al., *Post Office Electrical Engineers' Journal,* vol. 67, pt. 4, pp. 232–239, Jan. 1975.

"Development of Packet Switching Networks Worldwide" by Roberts, *Telecommunications,* Oct. 1976, pp. 28–32.

*Primary Examiner*—Douglas W. Olms

*Attorney, Agent, or Firm*—Peter Abolins; Clifford L. Sadler

[57] ABSTRACT

The Local Network Architecture (LNA) is an organization of a data communication network where the control and access to the communication channel is handled local to each user device interface. The device interface (Local Netowrk Architecture Interface or LNAI) is an electronic module which interfaces a user with the LNA communication network. This device adapter contains both a network port and a user interface port. This interface accepts user data and fragments it into data packets for shipment over a shared communication medium which is connected to the network port. A communication microprocessor is used to implement the functions of data buffering, routing, sequencing, flow control, acknowledging and error checking of data. Such distributed control eliminates the need for messages in the network to be forwarded to a message flow control process or computer station. Users supported by the system can include microprocessor based systems, programmable controllers, terminal devices, minicomputers and larger host computers. Since users differ in their exact communication conventions certain "personalities" can be imparted to the LNA device interface. These personalities allow data to be transmitted between users in a full transparent information mode in such a fashion as to be compatible with protocols implemented by those users and at different user transmission rates.

16 Claims, 17 Drawing Figures

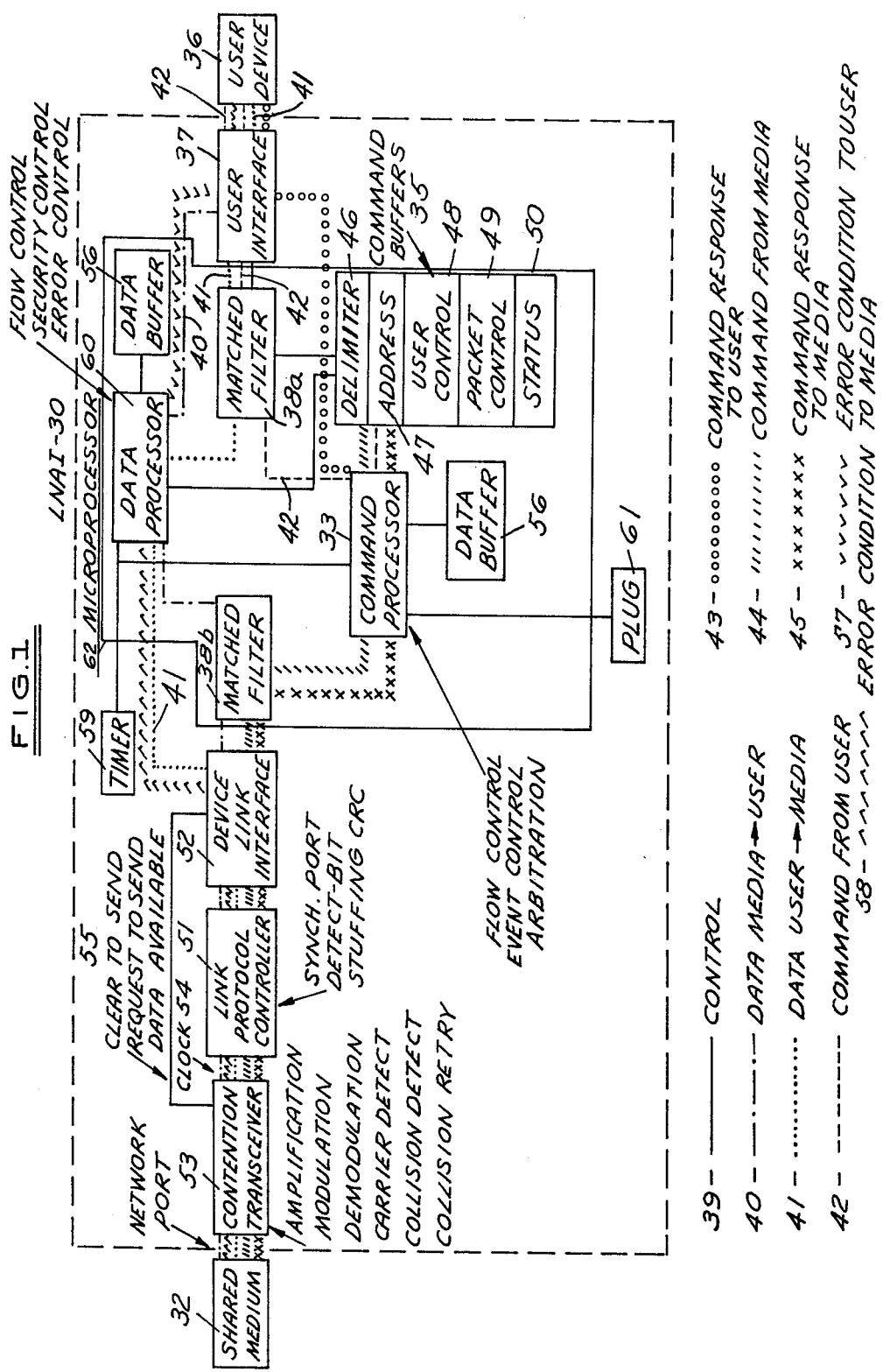

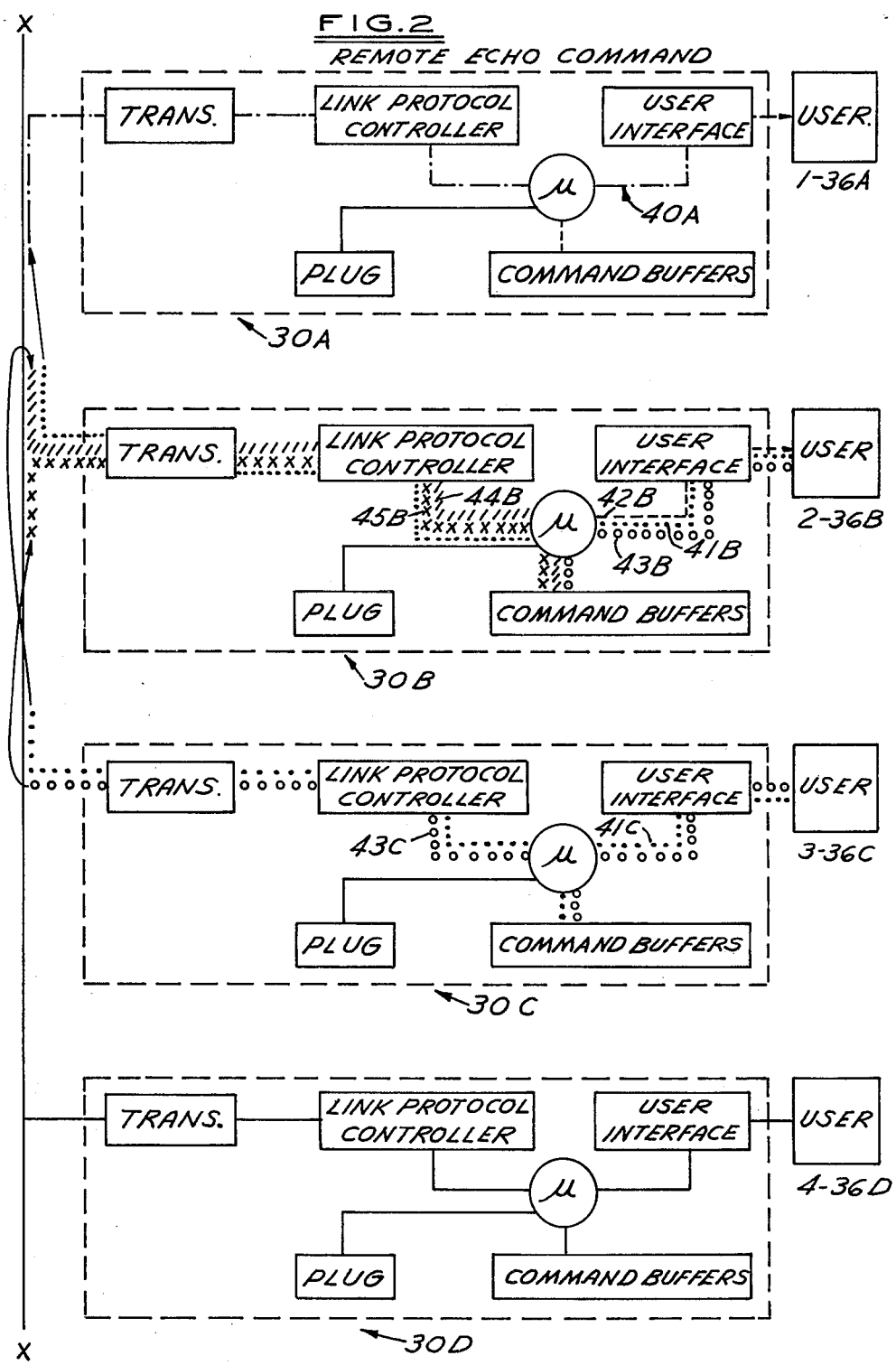

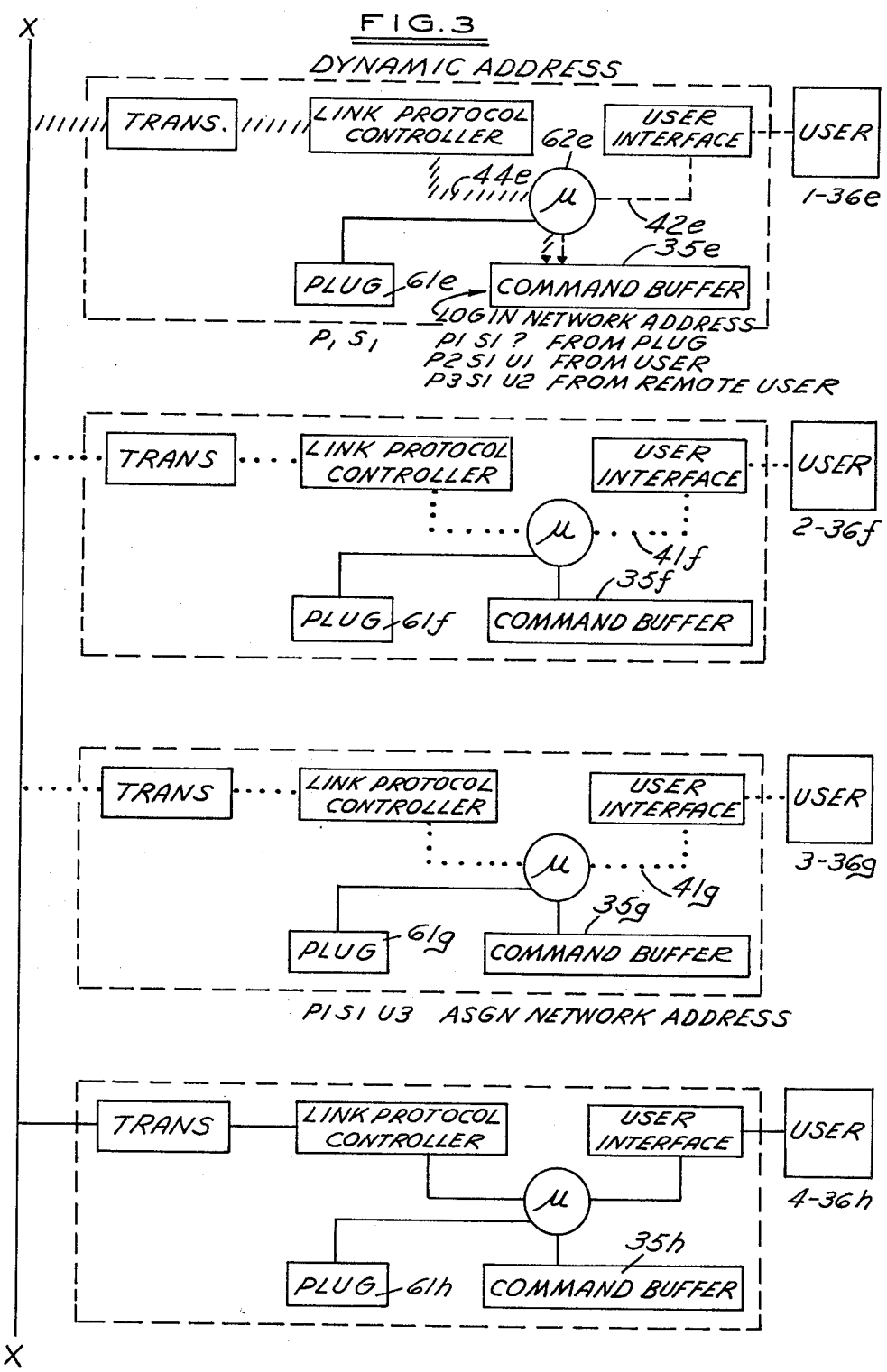

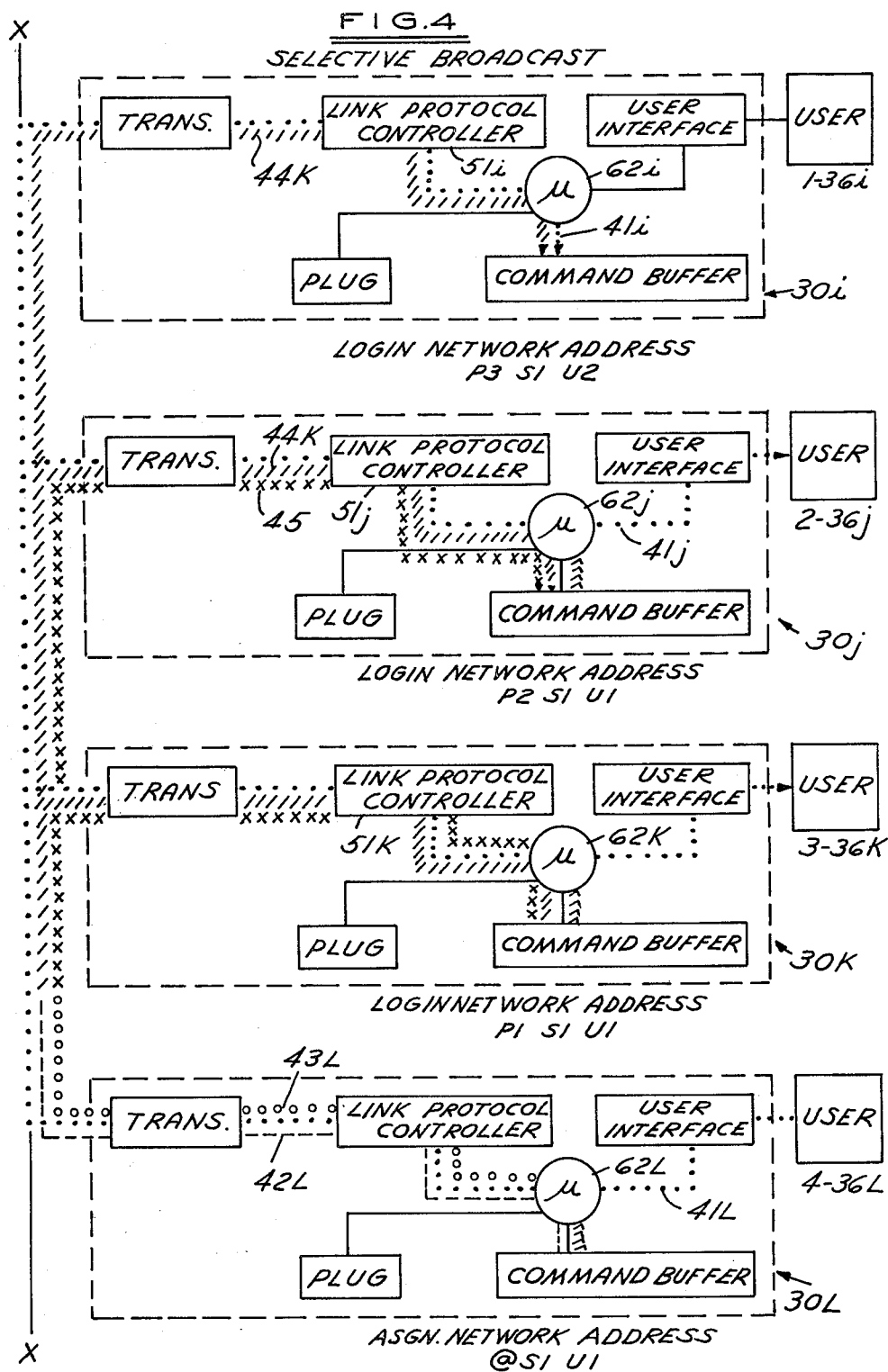

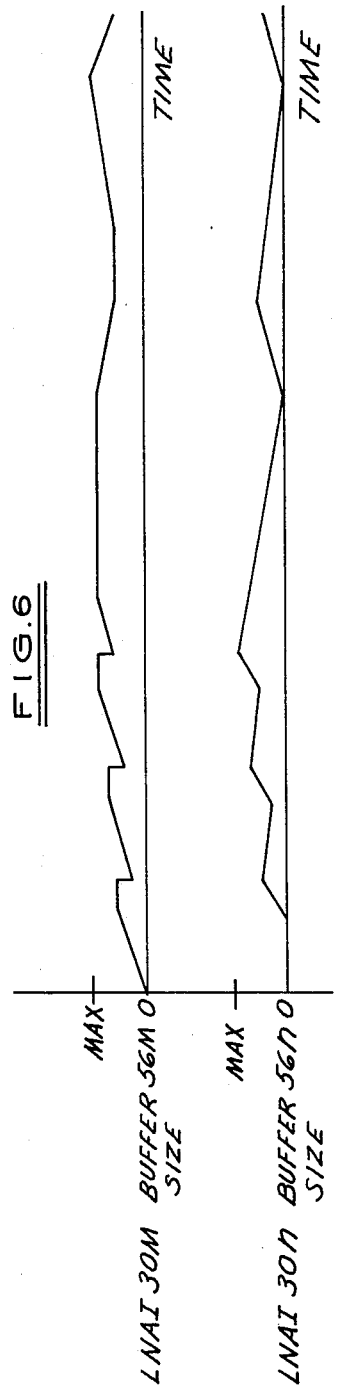
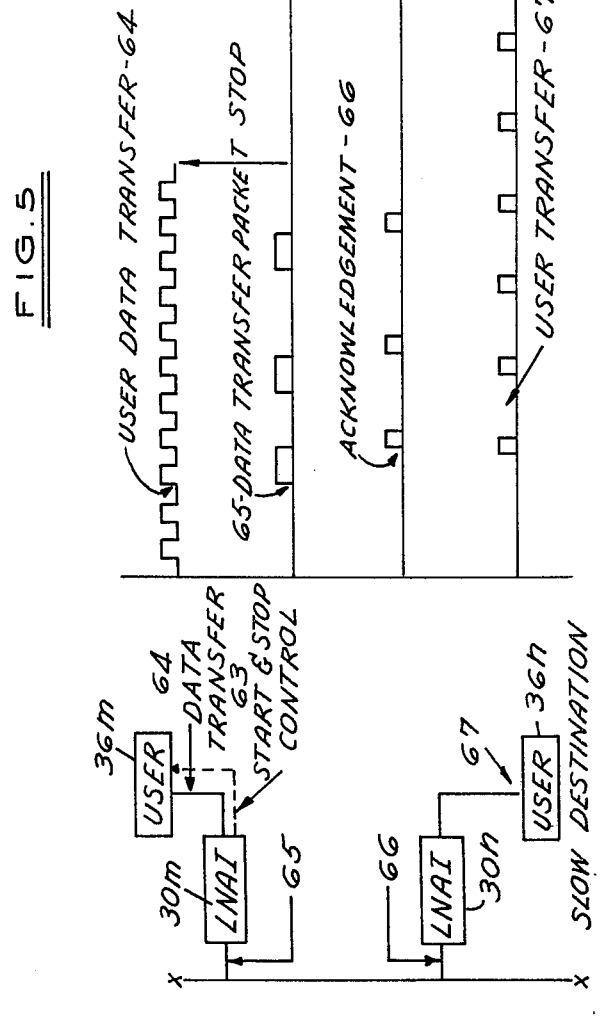

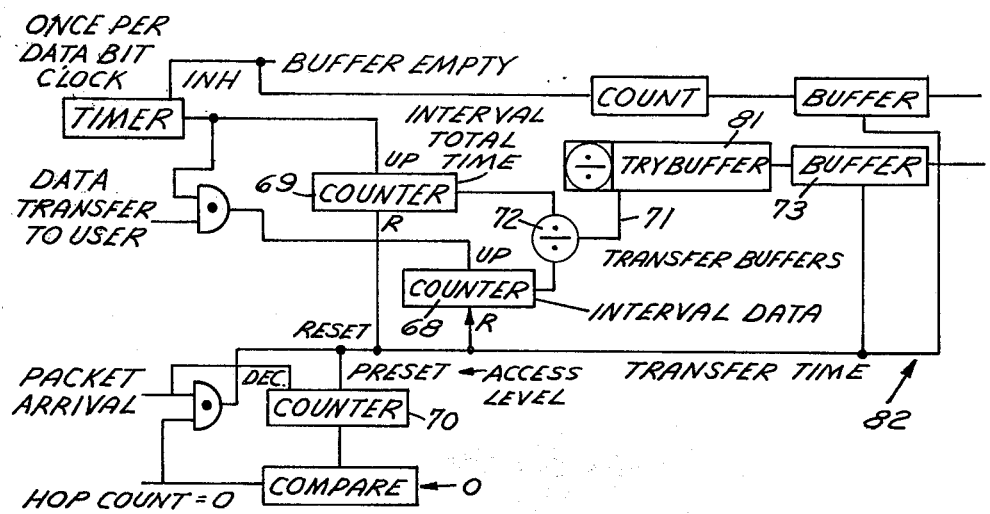
FIG. 7 FLOW CONTROL LOGIC FOR DATA RECEIVER LNAI
FIG. 8 FLOW CONTROL LOGIC FOR DATA SENDER LNAI

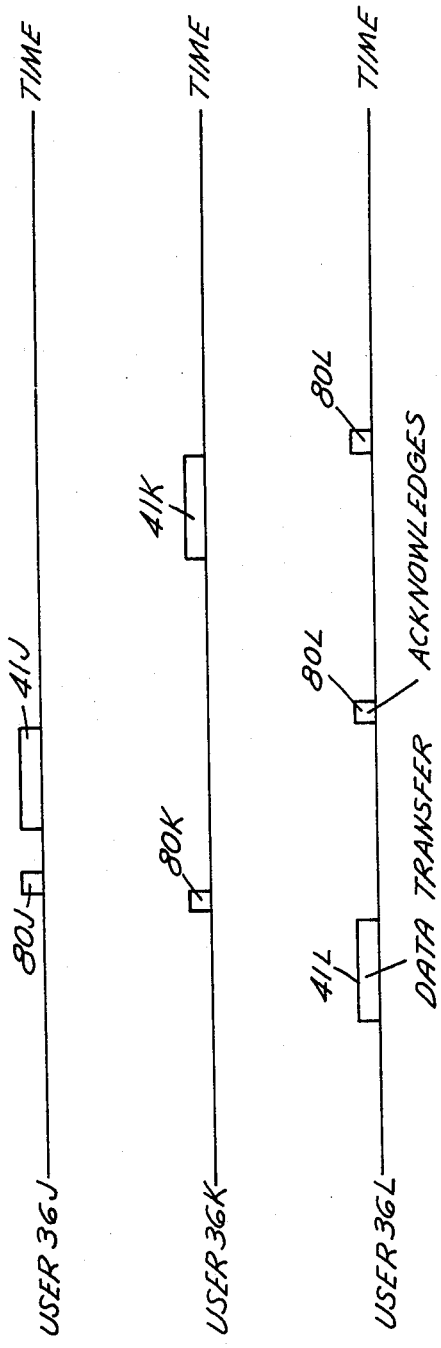
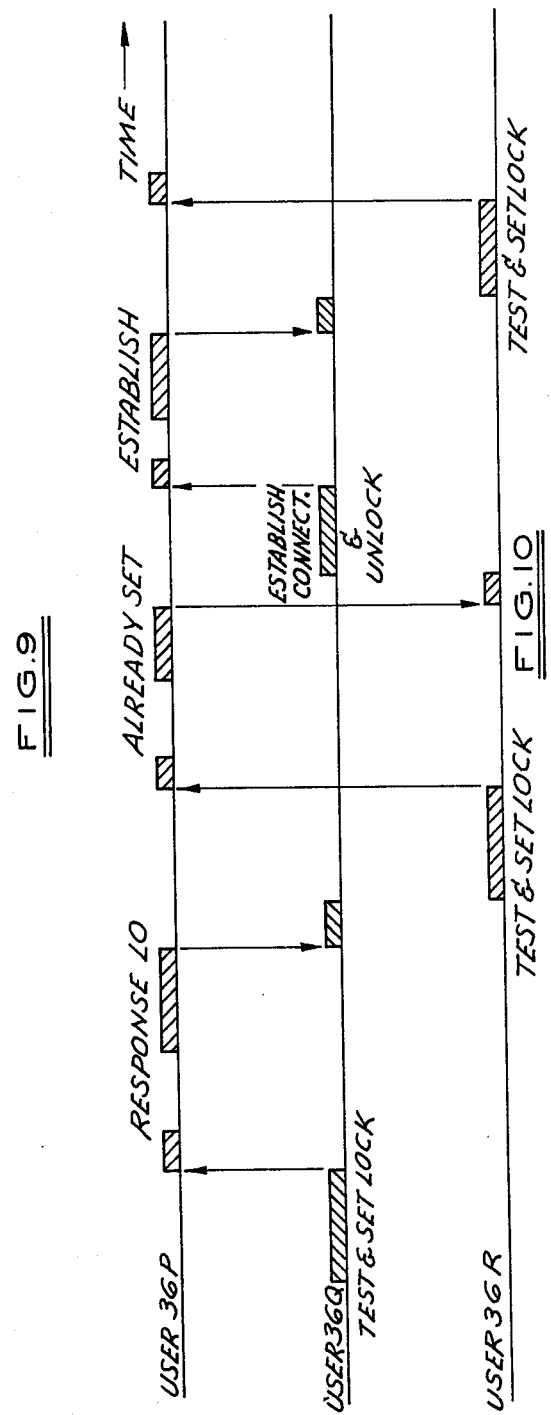

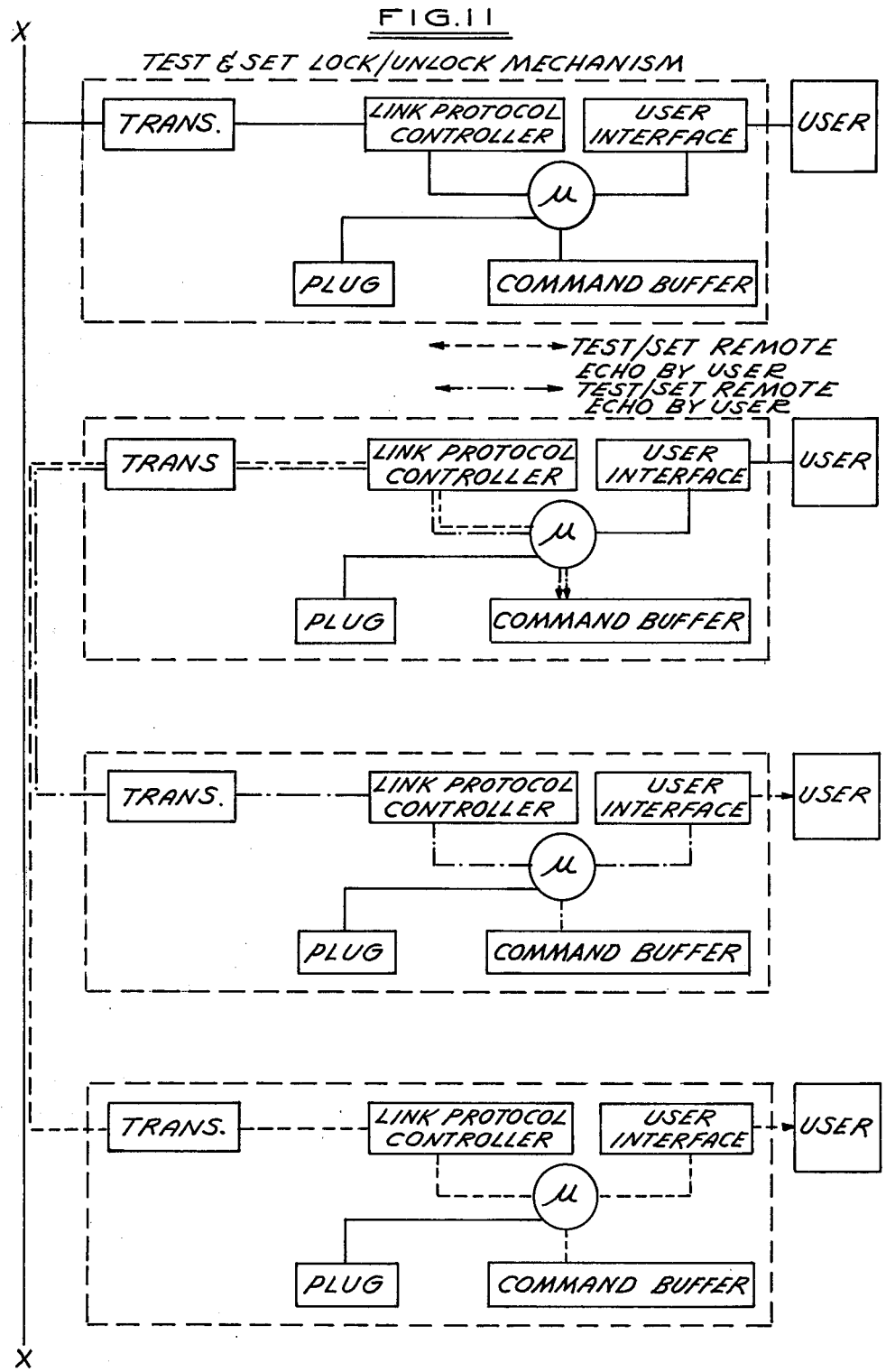

COMMUNICATION BROADCAST CHANNEL INTERFACE

BACKGROUND OF THE INVENTION (1) Field of the Invention

The present invention relates to a multipoint data packet switching communication system where the network is based upon a shared communication medium.

(2) Description of the Prior Art

Process control networks linking users can be organized into three distinct configurations which have inherent routing problems because there is no shared common communication channel:

I. Star configuration—One computer forms the center of network control (master) with separate lines to all other computers (slaves). These networks can be hierarchical since a slave computer to one star can be a master computer of a different star network.

II. Multidrop configuration—Again one computer forms the center of the network control. A line is dropped to each of the other computers from a trunk line. Communication is handled by polling or is sequencing from one computer to another. Communication between computers can be accomplished only by sending messages to the polling computer.

III. Ring configuration—In this configuration each computer is linked to two other computers in a closed ring. Messages from one computer to another are passed along by each intermediate computer retransmitting the message. Usually a network master exists to delete messages that have not been received.

Several difficulties arise when these configurations are applied to manufacture control systems. The networks do not adapt to problems such as system crashes, partial communication failures and recovery from complete network failures. In the star configuration, when a master computer fails, all slave computers are disconnected. This requires redundancy on all levels of the hierarchical control system. In a multidrop configuration, if a polling computer fails, no other computer can communicate. In the ring configuration any computer failure inhibits communications.

A recently introduced family of packet switched networks with decentralized control employs contention access techniques. Decentralized control eliminates a single, central controller whose failure would degrade operation of the system. The computers share one medium such as coaxial cable or a radio frequency and the contention for the medium is handled locally by each computer. The Aloha system uses a broadcast channel and transmission occurs at random. Second, slotted Aloha, a variation of the Aloha system, provides a time slot which can be shared by several computers. Transmission can only be initiated at the beginning of each time slot. Third, network systems use a carrier sense multiple access and retransmissions are based on individual time delays. A message checksum is used to detect interference caused by users transmitting simultaneously. The average packet delay is decreased by increasing the transmission rate. Ethernet handles the contention by a carrier sense multiple access (CSMA) scheme with collision detection. Transmission is permitted when idle (no carrier) is sensed. Two or more computers may sense idle simultaneously due to the propagation delay of the line. A message collision results from simultaneous transmission. When a collision is detected or a carrier is sensed, the transmitter drops off and waits a random amount of time weighted by the network traffic. Transmission is then retried. These contention networks have been used in office automation and teleprocessing applications.

A contention network allows for distributed control of communication with only passive elements used in the transmission medium. While this improves upon the reliability of previous approaches, it does not immediately adapt to manufacturing control applications. Each user of the contention network can participate in controlling communications. Furthermore, to provide high data rate service on the communication medium, all users must operate at this same high data rate unless the interface between the user and the communication medium can accommodate the different data rates. It would be desirable to improve upon the usefulness and adaptability of such a network by allowing a larger variety of user devices. In particular, it would be desirable to be able to support a relatively common user type which operates in a start-stop mode whereby information is transmitted in discrete segments. Various configurations such as star, multidrop and ring should advantageously be supported at the same time. Further, it would be desirable to solve the problem of providing an interface between a start-stop user device and a packet switched broadcast communication channel. The particular characteristics of such a user and channel must be accommodated by an interface. These problems and the problem of supporting communication connections by dynamically assigned configurations between different (heterogenous) user computer equipment are some of the difficulties this invention overcomes.

SUMMARY OF THE INVENTION

A network interface termed LNAI (local network architecture interface) is implemented to provide communication among a wide variety of user devices over a shared medium. The LNAI is an electronic apparatus which employs a contention network approach for multi-access to a shared medium, while supporting data acquisition and control computer applications such as process control, laboratory automation and on-board vehicle control. The LNAI arose out of the need for a microcomputer based communication system to implement product functional testing and process control in a manufacturing system.

The LNAI has the ability to distribute communication control without the need for user devices to decide how to transfer data or at what rate to transfer data. Thus, user devices may not contain any coputing capability (such as peripheral equipment like floppy discs, terminals and printers), minimal computing capability (such as data loggers) as well as substantial computing ability (such as general purpose computers). A user device needs only a means for sending or receiving data through a communications port attached to the LNAI.

In accordance with an embodiment of this invention, the LNAI assemblies packets of information for transmission from the data terminal equipment (users) and disassemblies packets of received information in accordance with command means in the LNAI. A shared medium such as coaxial cable or optical fiber can be used to connect all LNAIs. A user device can send and receive information to any other user device through a single port attached to the LNAI. A user can send commands to establish characteristics of the command means in any LNAI.

A feature of the LNAI functions is the detection of user generated commands as separate from data for purposes of accessing parameters of communications control in the LNAI. Since the user device is connected to the LNAI by only a single link, both data and commands must be communicated over this link. To differentiate between data and commands, a matched filter in the LNAI compares the communicated information with that of a stored internal reference to categorize the information as either command information or data information. A single LNAI may receive command signals from any user. To accomplish this, there can be a synchronizing mechanism in the LNAI so that only one user can change commands at any given time. Thus, user devices with only data transfer capabilities can use LNAI's, while other users may issue command signals to establish the parameters of communication control. Examples of communication control are the packet assembly and disasembly operations, packet addressing functions, start/stop user device characteristics and error reporting functions. Parameters are values which affect these controls such as the delimiter value, packet length and packet time out which affect the packet assembly mechanism.

BRIEF DESCRIPTION OF THE DRAWINGS

FIG. 1 is a block diagram of the LNA interface showing the user and the shared medium interfaces with a microprocessor contention transceiver and protocol controller in accordance with an embodiment of this invention;

FIG. 2 is a block diagram of a communication network showing the path of a remote echo command in accordance with an embodiment of this invention;

FIG. 3 is a block diagram of a communication network showing three data signal paths to the LNAI (Local Network Architecture Interface) address in accordance with an embodiment of this invention;

FIG. 4 is a block diagram of a communication network showing the data path of a broadcast to all users of a selected family with the same user address in accordance with an embodiment of this invention;

FIG. 5 is a part block and part graphical diagram showing a timing diagram of flow control between a high speed and a lower speed user in accordance with an embodiment of this invention;

FIG. 6 is a time diagram used in conjunction with FIG. 5 and shows the buffer size of LNAI data buffer in accordance with an embodiment of this invention;

FIG. 7 is a block diagram of the LNAI flow control logic for receiving data from other LNAI's in accordance with an embodiment of this invention;

FIG. 8 is related to FIG. 7 and shows flow control logic for sending data to other LNAI's in accordance with an embodiment of this invention;

FIG. 9 is related to FIG. 5 and shows flow control timing for data transfer with selective broadcasting in accordance with an embodiment of this invention;

FIG. 10 is a timing diagram of the conflict situation with the ordering of the access to LNAI parameters in accordance with an embodiment of this invention;

FIG. 11 is related to FIG. 3 and shows two users performing a remote echo on the same LNAI with the conflict being resolved by the lock/unlock mechanism;

FIG. 13A and 9B are the state diagram for data polling external events;

FIGS. 14A and 4B are the state diagram for data received from user port and cable.

DESCRIPTION OF SPECIFIC EMBODIMENTS

Figure 12:
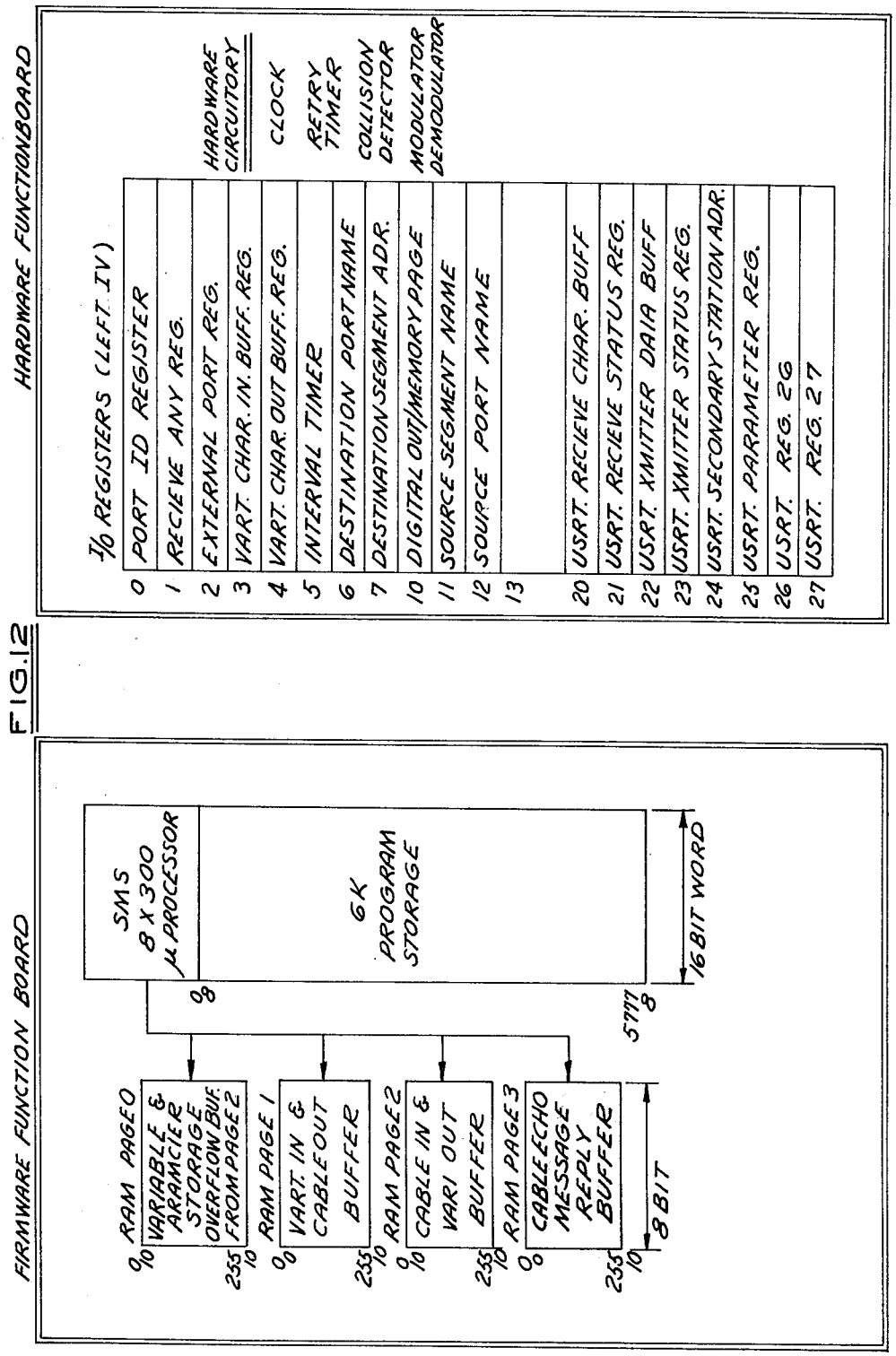
FIG. 12 is a block diagram showing the register layout of the LNAI interface.

The following is a discussion of terminology necessary to define certain components and abstractions.

The basic entity in this model implementation is an organization of apparatus to permit the execution of a particular process for transmitting information from one user to another user. A process is a series of operations leading to some result. A computer process as an example is composed of a procedure code, data storage and an interface for communicating with other processes. A command processor is one particular example of a process which is realized in every LNAI.

A network address is the means of identifying signals with processes. A network address has three sections of eight bits each designated port, segment and user address. A port address is identified with an LNAI. Initially, port addresses uniquely identify the physical location of an LNAI. Since a port address is also associated with processes, it may not be unique and can be dynamically changed. A segment address is identified with one shared medium. A user address identifies the specific user device process referenced by a signal. One user address may reference a family of user processes, one specific user process per LNAI user device.

A packet is a signal of a fixed maximum length used to carry information between ports. A gateway is an electronic interface between two shared media used to extend the number of LNAI's and the distance between LNAI's. A packet is of variable length and is used to describe the data/command signal format between LNAI data/command processors. A packet contains 20 eight bit sections as described below:

1. Flag—binary 01111110
2. Optional gateway port address extension
3. Port address—destination
4. Segment address—destination
5. Process address—destination
6. ; Destination delimiter
7. Port address—origin
8. Segment address—origin
9. Process address—origin
10. Optional gateway port address extension
11. ; Originating port address delimiter
12. Sequence Number
13. Control type packet service message types:
    R—read-send output buffer
    W—write-receive sequential message
    F—flush-flush input buffer and receive
    A—acknowledgement of sequence message null data body message
    N—negative acknowledge
    I—input message and acknowledgement of the message
    S—suppress output
    E—echo test with loop back and execute command
14. Access code
15. Optional field
16. ; Control field delimiter
17. Data body N-byte message field 80 bytes
18. Check field 1

19. Check field 2 packet checksum 2-byte length
20. Flag

GENERAL INTERFACE DESCRIPTION

Figure 15:
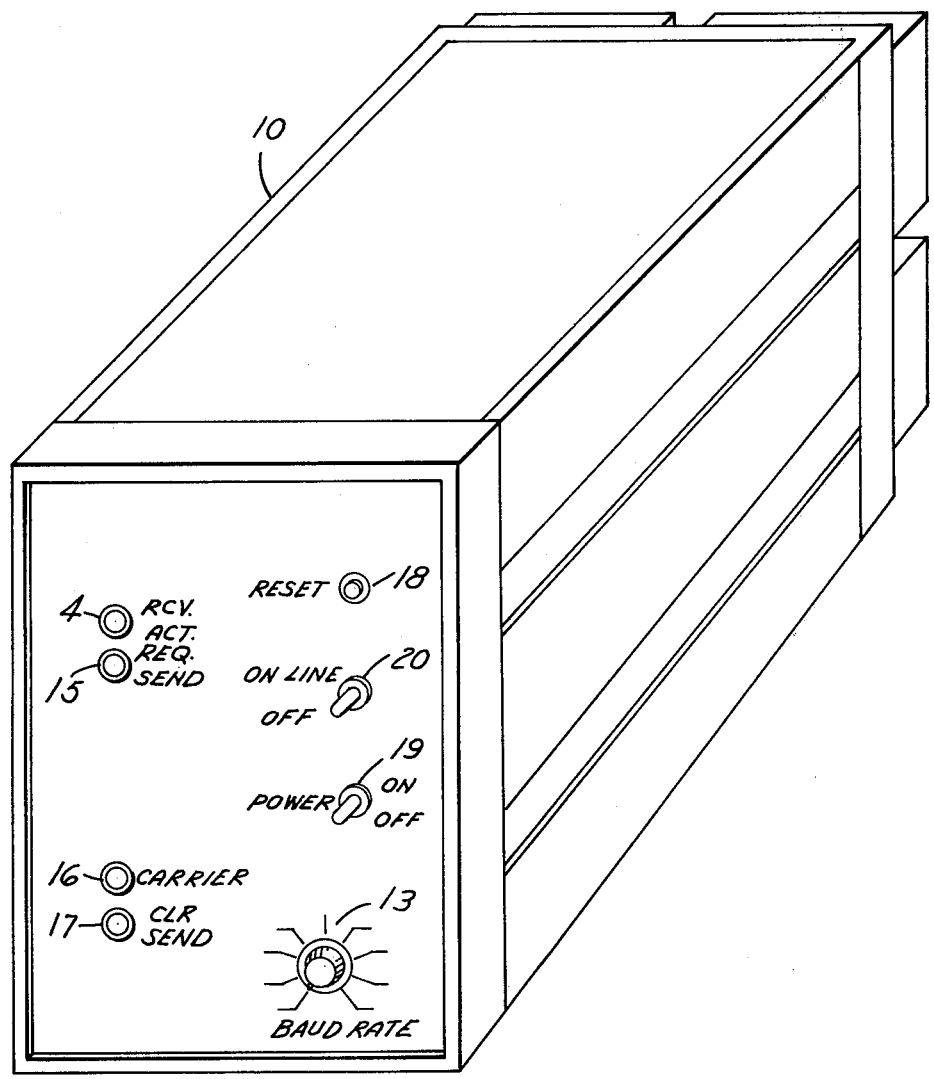
FIG. 15 is a perspective view of the exterior package of an LNAI in accordance with an embodiment of this invention.

Referring to FIG. 15, the LNAI package 10 contains a coaxial cable connector and a user connector for RS232 voltage or current loop equipment. The speed is selectable from 110 baud to 9600 baud. An 8 bit parallel user connector is also available for high speed users. This connection consists of eight data input lines, eight data output lines, and five control transistor-transistor logic (TTL) compatible lines. The control lines are as follows: data ready for input and for output, ready to receive data for input and output and interrupt user. The user can establish block transfers at rates up to 160 k bites/sec. The interrupt is used to establish the start of the block transfer.

The front panel contains four indicator lights which display the network transmission status as: receiver active 4, request to send 15, carrier on 16 and clear to send 17 (see FIG. 15). The reset button 18 reinitializes the communications connections and individual data buffers of the LNA interface to preset values. The power-up 19 circuit performs a reset. The on-line/off-line switch 20 is normally on-line for communications over the network. The off-line position physically separates the coaxial cable connection from the user. The LNA interface can be tested by the user simply by logically connecting to himself and testing that all data sent is received. By switching to off-line the same test indicates whether the LNA interface works without the cable connection. Thus, failures can be localized to digital versus analog faults.

SYSTEM DESCRIPTION

The LNAI 30 shown in FIG. 1 is a functional block diagram of the electronic components which interface a user device to a shared medium. The physical interfaces will first be described, then the components by following various signal paths through the components. The intent is to illustrate not only the functions of each component but their dynamic interactions in a communications system.

The user port 37 supports serial data in accordance with the data communication standards such as RS232C, RS422/RS423 and may support asynchronous data such as IBM's BISYNC and CC1TT recommended standard X25. Parallel interfaces with 8 data lines can be bidirectional or buffered, uni-directional with TTL or twisted pair current loop. The control signals such as RS232 request-to-send, clear-to-send and data signals slow the user device to interface with the shared medium by means of the LNAI 30. The user device 36 can send 41 and receive 40 data transfer signals to the shared medium 32 and command signals 42 to the LNAI command processor 33. User issued command signals 42 allow access to communication command buffers 35. The command buffers 35 via the command processor 33 modify control of data transfer signals 40 and 41 handled by the data processor 60 communications control logic. For example, command data buffers 35 hold binary network addresses, binary packet length and binary packet sequence counts. Self testing signals are used to detect faults in buffers and other electronics.

A user device 36 can issue data transfer signals 41 which are detected as commands 44 by any LNAI. Thus in FIG. 2, user 36C can issue a data transfer signal 41c which is detected as a command 44b by LNAI 30b. This can occur concurrently to user data transfer signals 40a and 41b between user 36a and user 36b. It is this capability which allows a user to communicate without having the computing logic for issuing command signals.

The signals issued by the user device 36 in FIG. 1, are processed by the user device interface 37 and then a matched filter 38 is used to detect command signals 42 from data signals 41. The matched filter 38a compares sequences of 48 bits in the signals with a prestored reference value plus 8 bits stored in the delimiter buffer 46. A match causes the signal to be processed as a command. To accommodate possible conflicts with certain user device signalling, the delimiter buffer 46 may be altered to make the reference sequence unique for that user 36.

A user command signal 42 is handled by the command processor logic 33 to change or to examine parameter values of communication control within buffer 35 as indicated by command signal 42. Upon completing this action a command response 43 acknowledging the changes or providing resulting examined values is returned to the user 36.

Data transfer between users can be changed whenever network interface address 47 and user control 48, and packet control 49 are changed by command signals 42 and 44. A unique 8 bit number terminates a command signal and enables data transfer. Data transfers can have any binary value and can be of any duration without interactions with command signal provided the 48 bit match does not occur. To enable complete binary transparency, user command signals can be prevented entirely.

The data processor 60 employs command buffers 35 which contain the parameters of communication control which define how to construct a packet transferred to the link protocol controller 51 through the device link interface 52 in 8 bit parallel form. The contention transceiver 53 allows a throughput about one hundred times faster than user device 36. User 36 burst data transfer rates may be of the same rate as the rate of transceiver clock 54. The average data transfer rate of the user is termed the throughput speed.

A device link interface 52 and contention transceiver 53 provide control means for signals. The link protocol controller provides bit stuffing binary transparency and a polynomial cyclic redundancy check (CRC) for error control. Contention transceiver 53 provides analog signal amplification, modulation and demodulation, carrier detection, collision detect and collision retry. These electronic stages are internal to this function and can be controlled by a line 55 carrying request-to-send, clear-to-send for transmitting and a data available signal for receiving. Network port 34 is half duplex, only receiving or transmitting can occur at any time instance. User port 31 is full duplex, both receiving and transmitting can occur at the same time. Contention receiver 53 is further described in copending applications: Conflict Resolution By Retransmission Delay On Shared Communication Medium, Ser. No. 46,577, Data Communication Code, Ser. No. 46,517, Interface Between Communication Channel Segments Ser. No. 46,576, filed on even data herewith, assigned to the assignee of this application, the disclosures of which are hereby incorporated by reference.

All data transfer and command signals performed by user device 36 can be performed from shared medium 32 in a symmetric fashion. An equivalent matched filter 38b separates data 40 and command signals 44. Command responses 45 are sent to the shared medium. Data transfers 40 are sent to the user device 36 through user device interface 37. Packet data buffers 56 allow for temporary holding of data while access to user device 36 or shared media 32 is being obtained. The data processor 60 compares the destination address in a received data packet from the communication medium 32 with the interface address 47 defined in the command buffer, the address detector rejects the data packet if the comparison does not agree; otherwise accepting the data packet if there is an agreement thereby disassembling the data packet and storing the disassembled information in the interface data buffer 56 for subsequent transmission to the user device.

Error conditions in the LNAI 30 are normally masked by error correcting circuitry, however, when a specific error in communication occurs, a data transfer signal 57 initiated by the LNAI 30 can be issued to any user device. Error control circuits includes a timer 59 for time-out cyclic redundancy checks on all shared medium signals and buffer tests. Any user can obtain the count of errors and other history status 50 by issuing command signals.

In FIGS. 1 and 3, the command processor 33 initializes command buffer 35 to preset values with microprocessor 62e and are alterable by three separate means through the command processor 33. Address buffer values 47 in command buffer 35e can be established dynamically by three separate signal means; the plug 61e address, a user command signal 42 and a command signal from the medium 44 (a remote user data signal). A plug 61e attached to the physical LNAI package 10 allows the physical network address to be read by the command processor 33. We shall designate the three eight bit sections of a network address by the prefix characters part, P, segment, S, and user, U. Initially on power up or reset the address is read from a plug, P1S1 representing 16 bits of the address in the example of FIG. 3. The user section of the address is a default value of "?". Since the plug is attached with connectors to the physical surroundings, this address can be used to locate LNAI 10 independently of the electronics used. Either a user command 43 or a command from a remote user 44 can establish the LOGIN network address 47 (FIG. 1). As used herein, "LOGIN address" is the name of the associated network interface. The LOGIN address is incorporated as a source address in transmitted packets. The LOGIN address is stored in address buffer 47 for establishing a stored destination address which can be appended to a data packet. FIG. 3 shows a network address, P2S1U1 established by a user command signal 42, and a network address P3S1U2 from a remote user 36f generated command signal 44e from the medium.

When a network address is established, previous values are replaced. For the remote user 36f to change the LOGIN network address, the previously established address P1S1 ? can be used as distination of the data signal 41f. Thus, any user can transfer data or command information as long as the correct network address is known by the remote user. An assign address, ASGN, stored in buffer 35g is used to direct data signal 41g to correct LOGIN network address. Thus, user 36g has ASGN address of P1S1U3 to send data to user 36e. Any user address matches a "wild card" user address designated by "?". User 36e ASGN address can be the LOGIN address of user 36g to allow full duplex data transfers between user 36e and user 36g. This is the normal data transfer mode.

The selective broadcast FIG. 4 allows more than two users to simultaneously communicate employing the broadcasted nature of the shared medium. Since each network interface 30i, 30j, 30k, 30l, in FIG. 4 receives the packet sent by user 36l, the decision on valid address is made jointly by the link protocol controller (LPC) 51i, j, k, l and microprocessor 62i, j, k, l, concurrently by all network interfaces 30i, j, k, l. By providing an ASGN port address of (@) (broadcast) each link protocol controller 51 will transfer the signal to the microprocessor 62. The microprocessor 62 compares packet segment and user address with LOGIN address 47 (FIG. 1) and transfers data signals 41j and 41k when identical to stored information characterizing users 36j, k and terminates data signal 41i when not identical to the stored information characterizing user 36i. If all users 36i, 36j, 36k, 36l have an (@) port ASGN address then a full duplex interchange is established.

Following the above discussion of addressing is a discussion directed to how remote users access command buffers. All addressing modes are applicable to the remote echo command defined by the packet service control type field "E". A remote echo command is a user generated data transfer signal 41 which is detected as a medium command 44 by some network interface. FIG. 2 shows user 36b generating a command signal 42b, and data transfer signal 41b to user 36a. User 36c is shown generating a remote echo command signal 41c to LNAI 30b. Since command signals may have responses, user 36c receives remote echo response 43c generated from LNAI 30b, as signal 45b, and user 36b receives response 43b. Since previous addressing modes apply to remote echo command, a selective broadcast can be performed with command signals.

FLOW CONTROL

When two or more users 36 are transfering data, the LNAI 30 accommodates the speed difference in user device signal rates by a flow control mechanism. This mechanism controls the data, transfer rate of signals 40, 41 of user devices 36 so that data transfers occur at the rate of the slowest device, no data is lost and instantaneous fast data transfers (bursts of data) are smoothed with LNAI data buffers 56. The flow control prevents user device 36 bumps (lack of information) due to start/stop signals which require time for response from sending user devices 36 by using predictive measures of user device data generation rates.

User devices 36 with start/stop controls 63, see FIG. 5, such as the RS232C ready to receive (user device start), not ready to receive (user device stop) and ASCII tape control characters DC1 (stop data transfer) and DC2 (start data transfer) and DC2 (start data transfer) (another example is X25 receiver ready (RR), receiver not ready (RNR) and level 2 and level 3) are incorporated in the LNAI 30 for slowing down a faster user. This is accomplished by providing data transfer rate information on positive acknowledgement packets.

Consider the two users of FIG. 5 with user 36m capable of producing more data 64 over time than user 36n can consume even though the instantaneous speeds of the user 36m, n may be the same. The data signals 64m from user 36m is converted to packets 65 by the LNAI 30m onto the shared media. Each signal received by LNAI 30n is positively acknowledged if the information is accepted (address and control correct). The acknowledgement packet 66 contains the destination port address (of LNAI 30m) the source port address (LNAI 30n) and a control with packet sequence count, acknowledge control designator and a rate count, of user 36n. The rate count is stored in LNAI 30m command buffer 35 and used in conjunction with the timer 59 to determine the time to initiate the next packet data transfer 65. In the example, rate counter differences cause an initial burst of data to be sent which was stored in buffers 56, when transmit and receive rates agree.

FIG. 6 shows the size of storage buffer 56 corresponding to the data transfer of FIG. 5. When packets are built, all data in storage buffers, up to the maximum length packet, is sent. This improves efficiency by reducing the ratio of packet header length to data length of the packet.

The service rate measuring logic is contained in data processor 60 (FIG. 1) and is more particularly shown in FIG. 7 for the LNAI 30n receiving signals. The service rate is computed by counting (in a counter 68) the number of bits transferred 67 (FIG. 5) to the user 36n divided by the time duration determined by a counter 69. When a data packet 65 arrives at LNAI 30n and the current hop counter 70 is zero, the access level of the packet 65 is set into the hop counter 70; the current service rate 71 computed by divider 72 is read into buffer 73 and counters 68, 69 are cleared; and the service rate from buffer 73 is included in the acknowledgement packet 66. Thus, service rate information flow is in the opposite direction to data transfer. If the hop count 70 is not zero, it is counted down upon packet arrival. The hop counter allows multiple packets between service rate information transfer as required when additional packet delays occur. When the buffer is full a negative acknowledge is returned.

FIG. 8 shows the service rate control logic for the data user 36n sender which is contained with data processor 60. A multiplier 74 times the receiver service rate buffer 75 (usually less than one) is used to adjust a desired service rate. The desired rate is enforced by comparing data transfer from user counter 76 divided by time duration counter 77 with the desired rate. When actual rate 79 exceeds the desired rate, a user stop signal is sent, otherwise a user start signal is used. User devices monitoring network performance may adjust multiplier 74 for better buffer utilization and less stop and start operation.

The amount of information stored in data buffer 56 going to user 36 (FIG. 1) is measured by data processor 60. This measurement is transmitted back to the original transmitter of the received packet.

So far flow control for two user devices communicating has been treated. Next, consider several user devices in a selective broadcast addressing mode. In this mode, the one LNAI 301 sends a data packet 41e, 41l and all LNAI's which receive the data correctly issue an acknowledgement. The values of the service rate and the amount of utilized buffer capacity is measured in microprocessors 62j and 62k (FIG. 4). These values are returned to network interface 301 by means of acknowledgement signals 80j and 80k (FIG. 9). The value of the service rate taken for use in governing flow control is the minimum of the two received rates.

Flow control during selective broadcasting must take into account concurrent user responses. For example, after user 36l sends a broadcast packet 41l to users 36j and k, response signals 41j, k from both user 36j and user 36k may proceed (FIG. 9). The LNAI 36j, k send packets 41j, k based on the rate which is determined by the number of users stored in TRY buffer 81 (FIG. 7). The result is that user 36l may be communicating to users 36j and k with a broadcast while users 36j, k are communicating to user 36l (in full duplex) using a single address. The flow control allows data to be transfered from users 36J and k to user 36l without overflowing user 36l's data buffers 56.

Flow control during remote echo command signals must take into account concurrent normal data transfer. In FIG. 4, user 36l issues a remote echo command in selective broadcast mode. Flow control governs the flow of information between command processor 33 within LNAI 30j, k, and user 36l. The flow control circuit 82 is within command processors 33 of LNAI 30i, j and flow control circuit 83 is within data processor 60 of LNAI 30l.

Thus selective broadcast command signals allow command control values to be uniformly with responses sent back to a user. For example, a command signal 43l to display the real time clock stored in the command control buffer 35 of each LNAI 30j, k can be broadcast. The response message containing the present value is then returned to the user 36l at his service rate from command processors 33j, k. Since clock access occurs on receipt of a command signal, and not when a response is given, all response values could be compared for synchronization up to the propagation delay and command processor response time distribution. This example is particularly important for real time data acquisition and control. If the destination of a command response is a plurality of users then all of the plurality of users can receive all clocks and compare the received clock values to each other and users own clock. In a fault tolerant clock design, only the local user would be allowed to reset his clock if different from the plurality of clock values.

An additional advantage to flow control with selective broadcast addressing is for control processing of demand data such as command processor generated alarms and error notification packets 57, 58. After a control user has allocated his available service rate equally among remote users, they will not respond at a greater rate than the control user can handle.

SECURITY CONTROL

It is sometimes desirable for the LNAI 30 to limit access to the command control buffers or the user devices. The default access privilege is established by the plug 61 externally coupled connected to cabinet 10. There are 3 bits to establish three modes of access (read only, read write, no access) for both the command signal and data signal for both the user and medium interfaces. These additional bits can be used to restrict medium and/or user access for both the command and data signals. The access privilege can be changed by means of command signals.

ERROR CONTROL

Now that logical addressing flow and security control mechanisms have been described, we shall explain the mechanisms for treating communications errors due to noise and faults in LNAI equipment. For each packet sent there should be a response either a positive acknowledgement, or a buffer full negative acknowledgement. Operation of data and command processors 33, 60 (FIG. 1) should not prevent reception of a packet due to processing delays. When faults occur, such as buffer 56, 35 read/write errors, packets may be missed, also packet CRC may detect bit errors during transmission. When this occurs no acknowledgement is received. The transmission is delayed and retired up to a maximum number of times. The control of each packet contains a sequence number so that lost acknowledgements do not cause the user to receive duplicate data. To guard against lost negative acknowledgements, the buffer full count is not reset so that information on the number is not lost, but only delayed until the next packet is sent.

When a fatal error occurs (e.g., no acknowledgements after N retries), a fatal error message can be sent to the user 57 and/or to a designated remote user 58. Alarm messages may also result from comparing statistics with threshold values, these messages are sent to the same locations as the fatal error messages. Status values maintained in command buffers can be interrogated by command signals.

USER INTERFACE FORMAT

The user 36 can enter commands 42 into the LNAI 30 by prefixing the command with the unique stored reference prefix [DLMT] LNA, where [DLMT] is a predefined value stored in delimiter 46 and [<] is the left nagle bracket. Command signals are terminated by the right angle bracket [>]. This prefix was selected to allow 8 bit binary transmission without misinterpreting data to be commands. During the entry of a command prefix a character delete (RUBOUT) and line delete) are allowed. The command is not processed or echoed until all the data in the outbound and inbound buffers 56 are gone. This implies that commands do not affect any data that has entered previous to a command.

The user can also enter data into interface 30. The data is assembled into packets by in accordance with one of three mechanisms: (1) time elapsed since receipt of last data character, (2) number of data characters and (3) based on a predetermined information stored in delimiter 46 so that the assembly of a packet is a function of a comparison of received information with stored information, the packet length terminating when the compared information is identical.

Fatal errors in the communication are reported in the same format as used to enter commands and are followed by the error number. The carrier signal is dropped if an error occurred or upon initialization.

Error 1 is the lack of communications after several retries.

Error 2 is trying to send data without defining the network address. The network address definition should be made either explicity in a command or by an automatic assignment upon receiving a message.

Error 3 is the lack of an acknowledgement packet to a gateway or interface between two communication channel segments. A tape control mode is also available.

The commands are summarized in the following table. The first two characters of the command are all that is required.

| COMMAND | FUNCTION | DEFAULT |
|---|---|---|
| CONTROL | Write (W), Read (R), Flush (F) Echo (E), Interrupt (I), Suppress Output (S), and Disconnect (D) control fields. | W |
| DELIMITER | Special character which causes transmission of a packet | . |
| DISPLAY | Display octal value in RAM | — |
| ECHO | Local echo of characters | NO |
| ERRORS | Display error messages (YES/NO) (YES/NO). | NO |
| HEADER | Receive complete packet with header (YES/NO). | NO |
| HOUR | Hour:Minute:second time | 0:0:0 |
| INIT | Reset all parameters and flush buffers. | — |
| LENGTH | Number of characters which cause transmission of a packet. | 31 |
| LOGIN | Log in source network address | plug |
| PACKET | Last packet sequence number received | 0 |
| REPLIES | Number of destination users with positive acknowledges | 1 |
| SEQUENCE | Last sequence number for data sent | 0 |
| TAPE | Tape control mode for start/stop of file transfer (YES/NO). | NO |
| TEST | Run RAM memory test. | — |
| TIME | Time which causes transmission of a packet in .1 second resolution. | 1 |
| VERSION | Display version number. | |

The statistics can be displayed and consist of the following:

(a) Average number of USRT (universal synchronous receiver transmitter) receive errors per 1000 packets (b) Average number of USRT receive errors due to buffer full condition per 100 packets (c) Average number of USRT transmit errors per 100 packets (d) Average packet length per 100 packets (e) Number of packets built during last minute (f) Histogram for frequency of try counts—average per 100 packets.

Some examples of using these commands are as follows:

EXAMPLE I [del]<LNA LO=TC1, AS=DC1, SE=0, PA=0>

This command logs a terminal in as TC1 and assigns the user with address DC1. A sequence number and packet number of zero is used to indicate an initial connection and communications can begin from the terminal provided the computer is previously disconnected.

EXAMPLE II [del]<LNA CO=D>

This command forces the last character to disconnect the connection with the user.

EXAMPLE III [del]<LNA LO=TC1, AS=AC1, CO=E, TI=0>[del]z<LNA LO, AS, SE, PA>[del]

The first command sets the terminals LNA into the echo mode and establishes a packet not to be sent on timeout. The second line is echoed to AC1, the z is echoed, the command is executed and the message <z LNA LO, AC1, AS, TC1, SE, 000, PA, 000> is returned.

It is expected that other user formats will be employed in using this invention, the format is given here as illustration. For example, a packet interface user (i.e., X25 standard) may incorporate the commands in packet fields.

SIGNAL ARBITRATION

Command signals are processed completely and results returned before subsequent command signals are permitted. Unlike data signals, the user 36 must guarantee commands have been properly sent and executed by waiting for the command response signal 44. Since the complete command signal 44 is processed before another user device command signal is accepted, an entire sequence of buffer 35 values could be accessed without interference from other user 36.

An arbitration mechanism is required, however, if a user device 36 would like to examine buffer values before modifying them without conflict from other user devices 36. An example is when a user device issues a command to find out whether an LNAI 30 is in use (LOGIN user address =@), then modifies the LOGIN address if not in use. Other user device modifications should be interlocked by use of an arbitrator.

FIG. 10 shows a timing diagram of users 36p, q, r, from FIG. 11 in which the signal arbitrator lock and unlock events have occurred. In FIG. 10 user 36q issues a command signal 42q to test a lock condition and set the lock if not already set. LNAI 30p acknowledges the packet and issues a command response 45p which is acknowledged by user 36q. User 36q has already locked the command processor 33p. User 36q issues a command 42q to establish a connection and unlock. After processing by LNAI 36p, then user 36r can successfully perform a test and set lock.

The importance of signal arbitration is that one or more users can control communication command buffer 35 values without conflict. Thus, when a failure occurs in user 36q or user 36r the other user can process requests to change command 35 buffer values. Also, these users do not need to share current data buffer values, since only one copy is kept local to each LNAI 30. To protect a user failure with a lock set, an LNAI 30 timer 59 will release a lock within a fixed interval of time. This particular signal arbitrator illustrates the advantages of synchronism between users 36 as implemented by the LNAI 30. Since several synchronizing schemes are known for electronic processing, the particular arbitrator used is for illustration.

The specific user format is to perform the test and set command within one packet so as to provide an indivisible operation for the LNAI 30. The indivisibility is due to the fact that packets are received and executed one at a time. Hence, the test and set functions must be performed within a packet. This is implemented by first testing any device parameter before entry into the device command mode. The following string may be used to accomplish the test and set mechanism: (,LO, [DLMT]<LNA )

If another process had entered its critical section then the device parameter requested would result in a value to be returned in the response packet; otherwise, the original packet would be echoed. This is the locked response (, LO, XYZ, [DLMT]<LNA ) and this is the unlocked response (, LO, [DLMT]<LNA ).

The execution of the command string packet causes the device to be locked into the command mode of operation. After execution of a command the process must unlock the device. This unlock mechanism is accomplished by exiting the command mode by the right angle bracket character [>].

LNAI LOGIC

Now that we have explained the functioning of the LNAI, we shall explain the implementation. The LNAI data layout is shown in FIG. 12 and consists of a microprocessor controller and memory and a set of device input/output registers used for transmitting and receiving data.

The processor logic is to service both the user port and network port in both directions. The user incoming characters are read from the receiver register (LIV location 3) and outputed through transmitter data register (LIV location 4). The status of the user is available in the receive and register (LIV location 1 bits 3 and 4) and the control flags can be set in external register (LIV location 2 bits 5-7).

The transmission over the shared media is done through, for example, a Signetics 2652 multiprotocol LSI chip using the bit stuffing BOP option. Locations 20 through 27 of the LIV represent the internal registers of this chip.

The interval timer (LIV location 5) is an incrementing counter whose contents are available (read/write) to the processor logic. Each increment of the counter represents 5 milliseconds and bit 1 of the receive any register is set whenever the most significant bit of the 8 bit counter is set.

The read/write (RAM) memory is organized into four pages as follows:
Page 0—Program parameters and overflow buffer
Page 1—User port input and shared media output buffer
Page 2—Shared media port input and user port output
Page 3—Reply packet to be sent on the shared media for echo packets received.

The processor logic is organized to allow maximum throughput of data and achieve the intended functions.

Figure 13A:
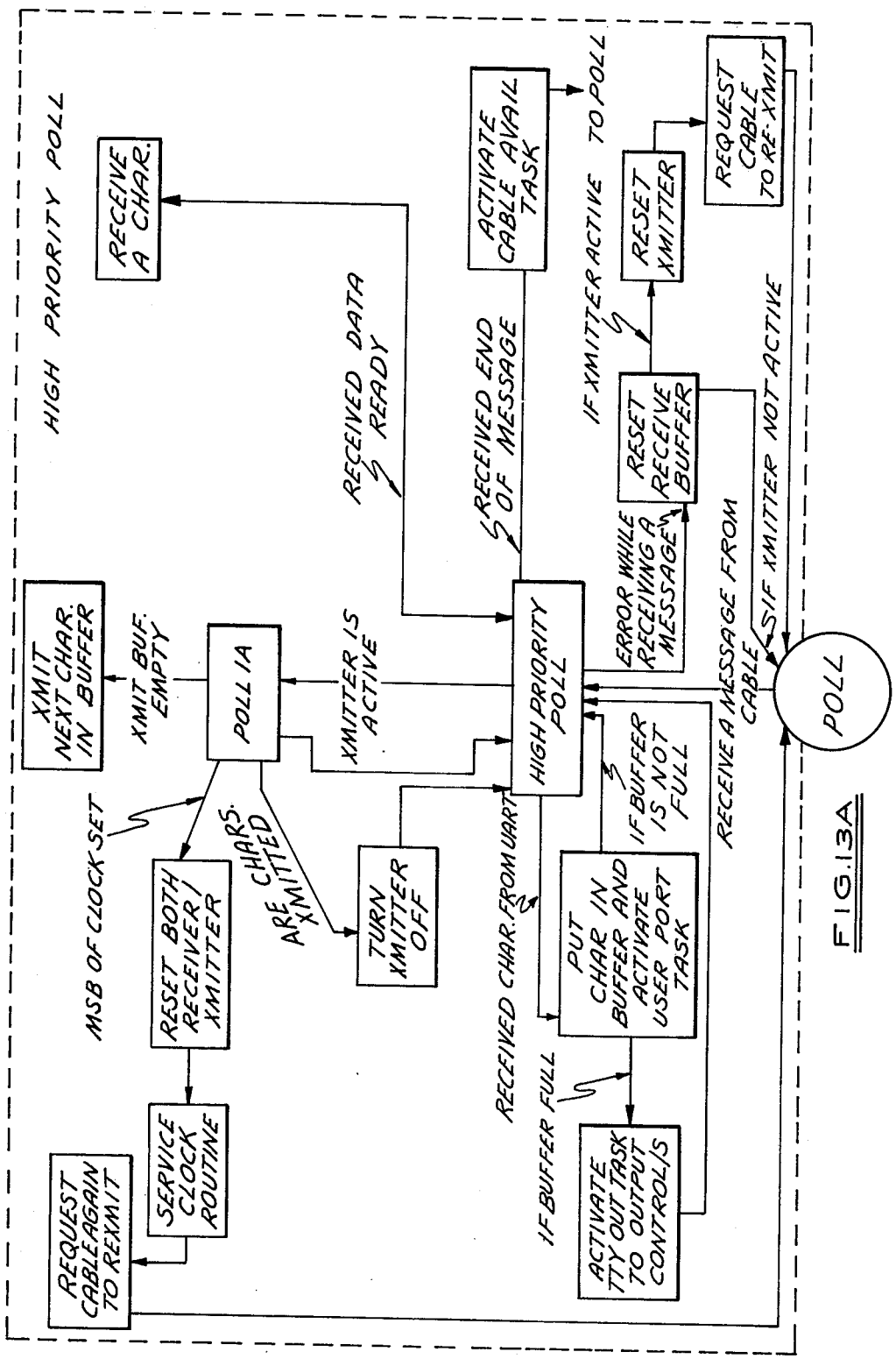
Figure 13B:
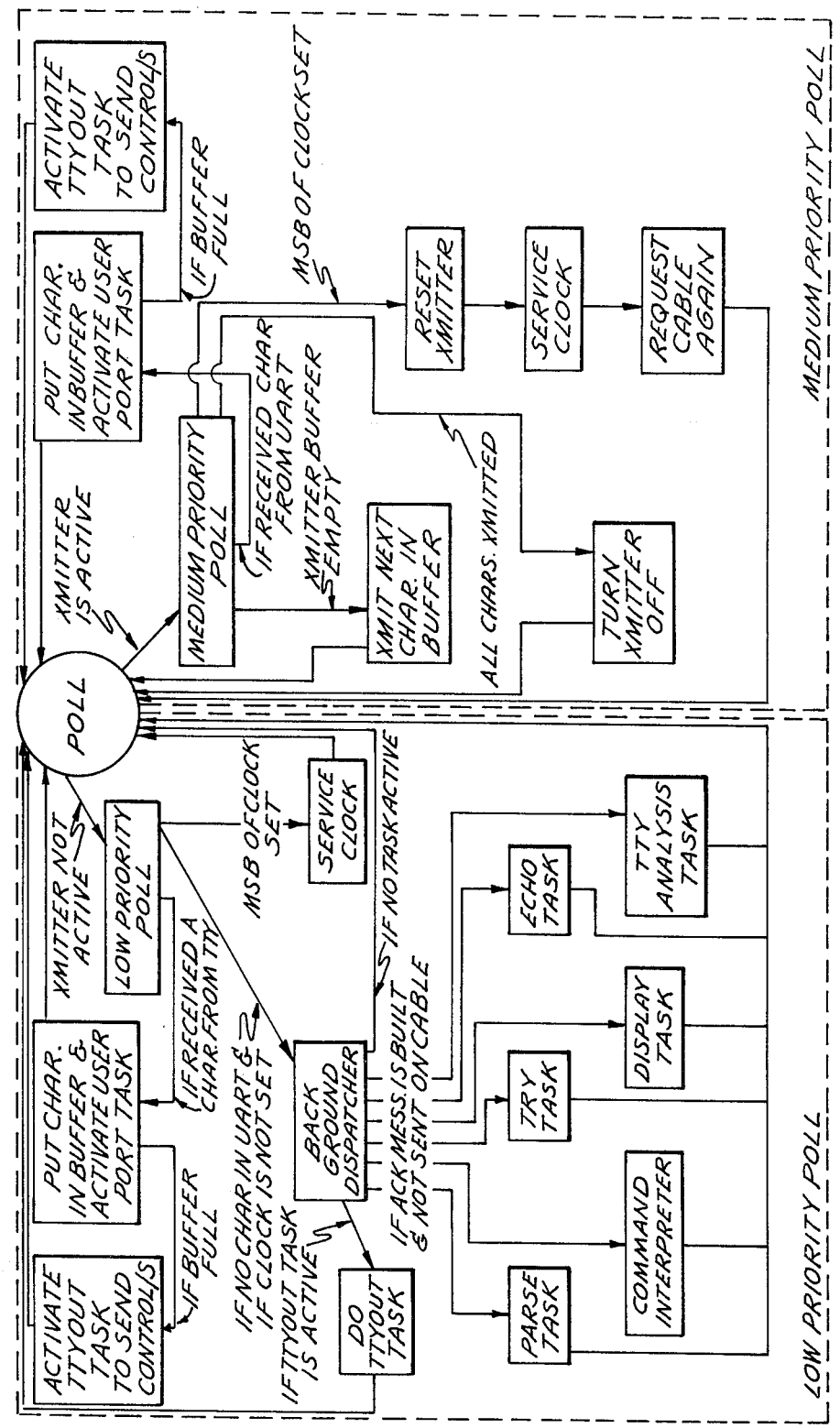

The tasks are organized as foreground, for high priority functions, and background for lower priority functions. The two state diagrams FIGS. 13A, 13B, and 14A, 14B are used to describe the interrelationships between the tasks. FIGS. 13A and 13B show the polling and foreground tasks including the following tasks:
A task to receive data from the shared media.
A task to send data on the shared media.
A task to receive data from the user port.
A task to get ready to send a packet when the shared media is available.
A task to service the clock.

Figure 14A:
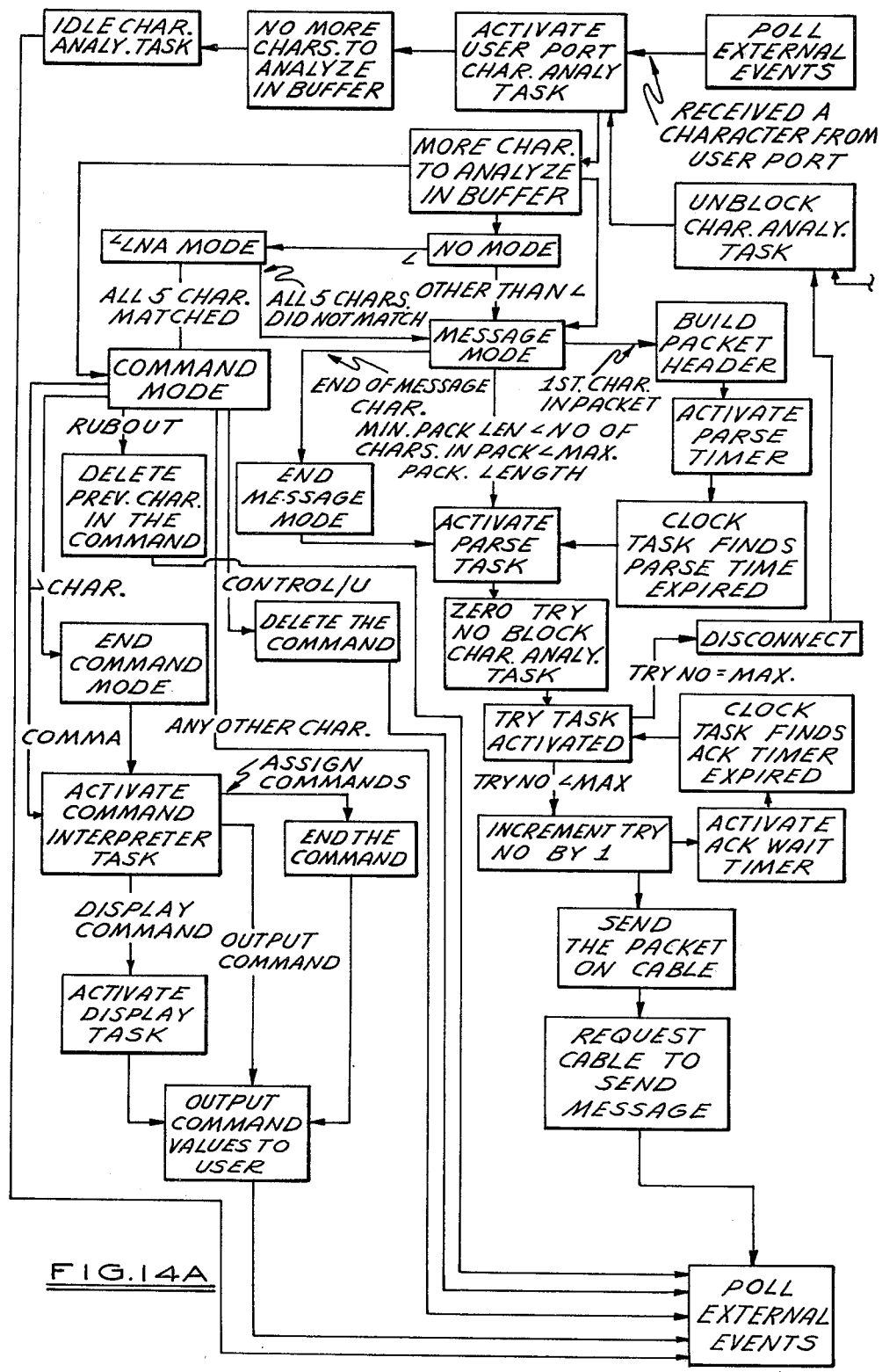
Figure 14B:
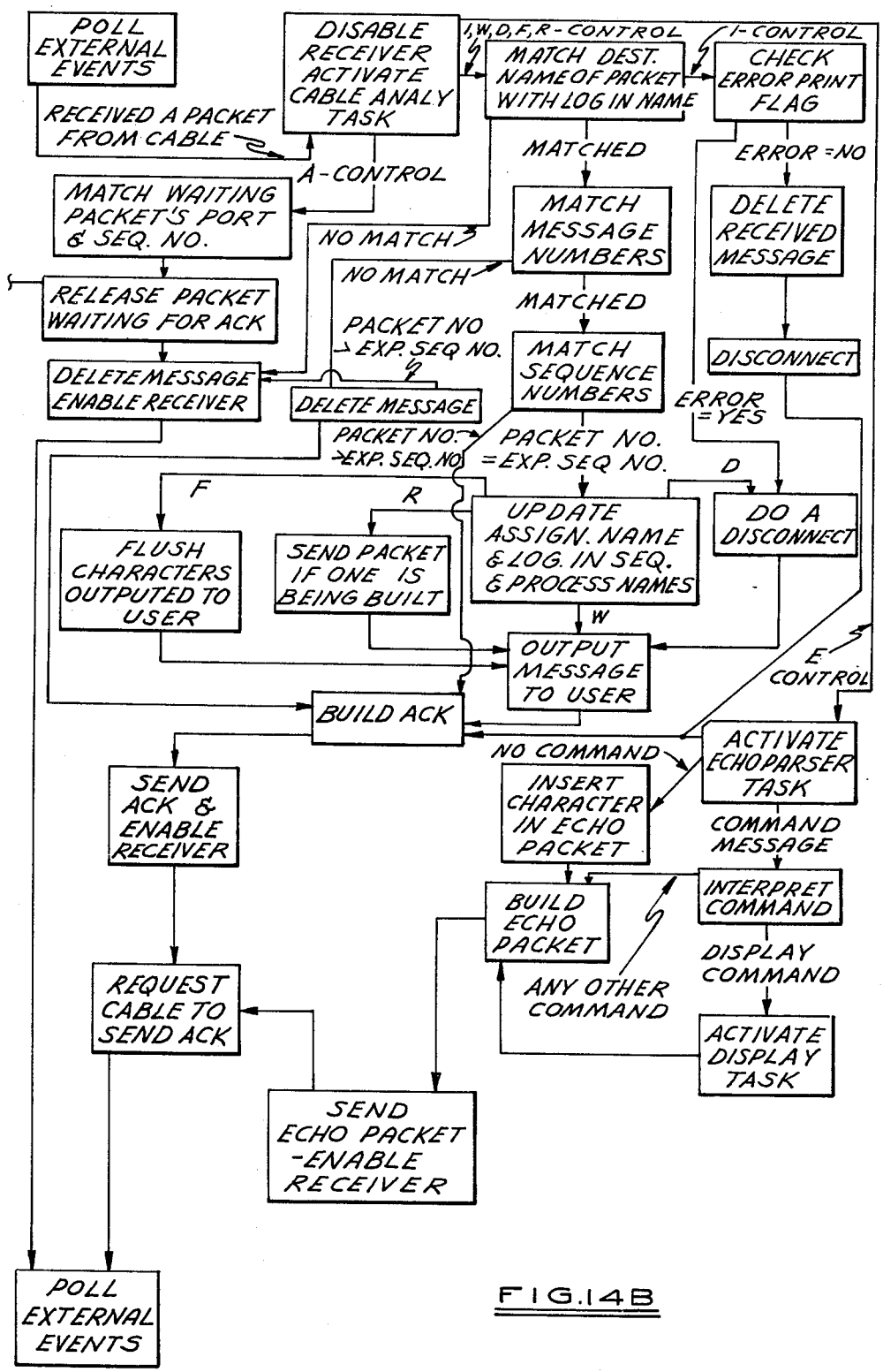

FIGS. 14A and 14B show the background task dispatcher and the background tasks including the following:
A task to analyze characters inputted from the user port.
A task to analyze the packet received from the shared media.
A task to prepare a packet for sending when the parse timer is expired.
A task to prepare a packet for resending when a positive acknowledgement is not received.
A task to interpret commands received from either port.
A task to interpret echo command packets.
A task to perform the display command.
A task to output characters to the user port.
A task which runs every minute to update statistics and time of day clock.

Various modifications and variations will no doubt occur to those skilled in the various arts to which this invention pertains. For example, the particular coding may be varied from that disclosed herein. These and all other variations which basically rely on the teachings through which this disclosure has advanced the art are properly considered within the scope of this invention.

We claim:

1. A data communication network comprising:
   a shared broadcast communication medium for carrying packet switched information;
   a plurality of user devices, such as data terminal equipment, for using said communication medium;
   a plurality of device interface means for coupling user devices to said communication medium, receiving user information from a user device for assembly into data packets for transmission on said communication medium, receiving data packets from said communication medium for disassembly into data to be transmitted to a user device, each of said interface means having a user port coupled to at least one of said user devices and a network port coupled to said communication medium, and including data transfer means for transmitting and receiving information over said medium; and
   each of said interface means including a command means for defining parameters of communication control which determine by their values the packet assembly and disassembly operations, packet addressing functions, type of packet service, start/stop user device characteristics and error reporting functions for use in conjunction with a user, said command means being responsive to a plurality of said users for the purpose of altering the parameters of communication control.

2. A data communication network as recited in claim 1 wherein said interface means includes matched filter means for storing reference information and for comparing said received information to said reference information to categorize said received information as either command information or data information 3. A data communication network as recited in claim 2 wherein said matched filter means includes a first matched filter for receiving information from said communication medium; and
   a second matched filter for receiving information from said user device.

4. A data communication network as recited in claim 3 wherein said device interface means includes a first storage means for storing a portion of said reference information and being alterable by command information passing through both said user port and network port.

5. A data communication network as recited in claim 4 wherein said interface means includes:
   a packet assembly means for assembling a packet of information in accordance with stored mechanisms in said packet assembly means; and
   a command means coupled to said packet assembly means for modifying said stored mechanisms stored in said packet assembly means.

6. A data communication network as recited in claim 5 wherein said stored mechanisms include:
   a first mechanism for determining the assembly of a packet as a function of a predetermined length of time;
   a second mechanism for determining the assembly of a packet as a function of a predetermined packet length; and
   a third mechanism for determining the assembly of a packet as a function of information stored in said first storage means by comparing received information from a user device with information stored in said first storage means, the packet length terminating when the compared information is identical.

7. A data communication network as recited in claim 1 wherein each of said command means includes an address means for defining the interface address of a user coupled to each of said interface means, said address means being responsive to commands from any of said users.

8. A data communication network as recited in claim 2 wherein said interface means includes destination means for establishing a stored destination address which is appended to the data packet.

9. A data communication network as recited in claim 8 wherein said interface means includes an address detection means for comparing the destination address in a received data packet from said communication medium with the interface address defined by said parameters of communication control in said command means, said address detector means rejecting the data packet if the comparison does not match and accepting the data packet if there is a match thereby disassembling the data packet and storing the disassembled information in said interface means for subsequent transmission to said user device.

10. A data communication network as recited in claim 8 wherein said destination means is adapted to define a selected plurality of device interface means so that a transmission from one user device will be broadcast to the selected plurality of device interface means sharing said communication medium.

11. A data communication network as recited in claim 1 wherein at least some of said interface means include a monitoring means for collecting communication statistics describing the information handling characteristics of user devices and device interface means.

12. A data communication network as recited in claim 8 wherein said interface means includes a means for modifying the stored destination address.

13. A data communication network as recited in claim 1 wherein said interface means includes a reading means for interrogating the parameters of communication control in said command means of other interface means thereby determining the communication characteristics of other interface means.

14. A data communications network as recited in claim 13 wherein said plurality of interface means each have different throughput speeds and each of said interface means includes a service rate measurement means for measuring the rate at which information is transmitted to the user device and means for measuring the amount of information stored in said interface means for transmission to the original transmitter of the information, said interface means being adapted to change the packet assembly such that the transmission of data packets will not overflow the storage capacity of the receiving interface means.

15. A data communication network as recited in claim 13 wherein said interface means includes a synchronizing means which controls the asynchronous accessing of the parameters of communication control, said synchronizing means generating a lock signal when communication is established between a first interface and a second interface thereby preventing simultaneous commands from more than one interface and for generating an unlock signal indicating that said interface means is ready to accept commands from other interface means.

16. A data communication network as recited in claim 15 wherein said interface means includes means for testing and setting the lock and unlock signals from a plurality of other interface means for facilitating the transmission of commands, and insuring that only one unlock signal is acted upon.

* * * * *